United States Patent
Inaba et al.

(10) Patent No.: US 6,365,287 B1
(45) Date of Patent: Apr. 2, 2002

(54) MAGNETIC RECORDING MEDIA AND MAGNETIC STORAGE DEVICE

(75) Inventors: Nobuyuki Inaba, Hasuda; Tomoo Yamamoto, Hachioji; Teruaki Takeuchi, Moriya; Masukazu Igarashi, Kawagoe; Yoshio Takahashi, Koganei, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/487,172

(22) Filed: Jan. 19, 2000

(30) Foreign Application Priority Data

Jan. 21, 1999 (JP) .......................... 11-013358

(51) Int. Cl.$^7$ .............................. G11B 5/66; G11B 5/70
(52) U.S. Cl. .............................. 428/694 T; 428/694 TS
(58) Field of Search .......................... 428/694 T, 900, 428/694 TS, 694 TP

(56) References Cited

U.S. PATENT DOCUMENTS

| | | | |
|---|---|---|---|
| 5,660,929 A | * | 8/1997 | Suzuki et al. ............... 428/332 |
| 6,080,476 A | * | 6/2000 | Kanbe et al. ............... 428/332 |
| 6,183,893 B1 | * | 2/2001 | Futamoto et al. ......... 428/694 TS |

FOREIGN PATENT DOCUMENTS

| JP | 10-269548 | 10/1998 |
|---|---|---|
| JP | 10-289437 | 10/1998 |
| JP | 10-334444 | 12/1998 |

OTHER PUBLICATIONS

Inaba et al., "Compositional and Temperature Dependence of Basic Magnetic Properties of CoCr–Alloy Thin Films", IEEE Trans. Magn., vol. 36, No. 1, Jan. 2000, p. 54–60.*
IEEE Transactions on Magnetics, vol. 34, No. 4, Jul. 1998, pp. 1558–1560.
7Th Joint MMM–Intermag Conference Abstracts, San Francisco, CA Jan. 6–9, 1998 Session ZA—"Past and Future of Magnetic Storage".

* cited by examiner

Primary Examiner—Holly C. Rickman
(74) Attorney, Agent, or Firm—Mattingly, Stanger & Malur, P.C.

(57) ABSTRACT

It is an object of the present invention to provide a magnetic recording medium which has a high level of magnetic anisotropy energy, retains stably the state of recording magnetization within the operating temperature range and is suitable for high-density recording with a low noise level, and a magnetic storage device for the magnetic recording medium. For attaining the above object, the magnetic recording film of the magnetic recording medium is characterized in that its magnetic anisotropy energy constant $K_u$ at an absolute temperature of 300 K is greater than $3.6 \times 10^6$ erg/cc and the average particle diameter is larger than 5 nm and smaller than 12 nm.

6 Claims, 3 Drawing Sheets

MAGNETIC RECORDING MEDIA AND MAGNETIC STORAGE DEVICE

BACKGROUND OF THE INVENTION

The present invention relates to a magnetic recording medium suitable for high-density recording and also to a magnetic storage device with said magnetic recording medium.

The magnetic recording system is divided into two types, that is, longitudinal recording and perpendicular recording, with the former being widely prevalent. The longitudinal magnetic recording system carries out magnetic recording by forming recording bits by the magnetic field generated by the magnetic head in such a way that the N-pole of one bit butts against the N-pole of its adjacent bit and the S-pole of one bit butts against the S-pole of its adjacent bit, the recording bits being arranged parallel to the plane of the magnetic recording medium. For this recording system to have a high recording density and to generate a high reproducing output, it is essential to reduce the effect of demagnetizing field on the recorded bits. To this end, attempts are being made to reduce the thickness of the magnetic film and to increase the coercive force in the magnetic film.

The perpendicular recording system performs magnetic recording in the following way. Recording bits are formed by the magnetic field of the magnetic head in the direction perpendicular to the film plane of the magnetic recording medium having the perpendicular magnetizing anisotropy, with adjacent bits being magnetized in the anti-parallel direction. Thus, the magnetic pole of one bit has a polarity opposite to that of its adjacent bit. As a result, the magnetic moments of adjacent bits attract each other. This stabilizes magnetization for recording and increases the coercive force, thereby contributing to high-density recording.

In both recording systems, an increase in coercive force is an important factor to improve the recording density. One of the factors to determine coercive force is magnetocrystalline anisotropy energy. This is a measure to indicate the ease with which the magnetic moment in magnetic crystal grains is oriented in a specific crystalline direction. The greater the value, the easier the orientation. For example, in the case of Co crystal grains, the magnetic moment easily orients in the direction of the c axis of the hexagonal closed-pack crystal lattice. (This is the axis of easy magnetization.) The magnetocrystalline anisotropy energy (or the magnetic anisotropy constant) $K_u$ is $4.6 \times 10^6$ erg/cm$^3$.

The energy to orient the magnetic moment in crystal grain in the direction of axis of easy magnetization is given by $K_u V$, where V is the volume of crystal grain. On the other hand, the magnetic moment fluctuates due to thermal vibration. The energy of thermal vibration is given by $k_B T$, where $k_B$ is Boltzmann constant and T is an absolute temperature.

The behavior of the magnetic moment varies depending on the relative magnitude of $k_B T$ and $K_u V$. If $k_B T << K_u V$, the magnetic anisotropy energy is sufficiently large and hence the magnetic moment orients approximately in the direction of the c axis of crystal grain. If $k_B T >> K_u V$, the energy of thermal vibration is larger than the magnetic anisotropy energy and hence the magnetic moment continues thermal vibration (super paramagnetic state). This thermal vibration causes the inversion of magnetic moment to take place with a certain probability per unit time. For example, the energy of thermal vibration required for the inversion of magnetic moment to take place with a probability of 1/e per second is $25 k_B T$. If this inversion takes place, the coercive force decreases as time lapses along with the probability, resulting in a decrease in recording density. Therefore, the recording medium should at least meet the condition of $25 k_B T << K_u V$.

In the meantime, among the related art media for high-density magnetic recording is magnetic film of $Co_{81}Cr_{15}Ta_4$ alloy. (See IEEE Transaction of Magnetics, vol. 34, No. 4 (July 1998), pp. 1558–1560, as the first US literature.) This magnetic recording medium has a magnetic anisotropy energy $K_u$ of $1.3 \times 10^6$ erg per cm$^3$ at about 300 K (absolute temperature T).

The above-mentioned medium is characterized by a magnetic grain size of about 15 nm (on average) and a film thickness of about 20 nm. The magnetic anisotropy energy possessed by a single magnetic crystal grain is $K_u V = 4.6 \times 10^{-12}$ erg. On the other hand, the energy of thermal vibration at room temperature (300 K) is $k_B T = 4.1 \times 10^{-14}$ erg. Thus, $K_u V >> 25 k_B T$. In other words, under the present condition of crystal grain size, the magnetic anisotropy energy is much larger than the energy of thermal vibration, and hence the magnetic moment is fixed in the direction of axis of easy magnetization and this leads to a sufficiently large coercive force.

For both recording systems to have an increased recording density, it is important not only to increase the reproduction output for high-density recording but also to reduce the noise of the medium. The noise of the medium in a state of high-density recording results from the zigzag magnetic domain wall in the transition region of the recording bit. The greater the fluctuation of the magnetic domain wall, the greater the noise. Thus, common practice to decrease noise is to reduce the particle size of the magnetic crystal grains constituting the magnetic recording medium, thereby to reduce the fluctuation of the magnetic domain wall in the transition region.

The related art recording density (as experimental data) is 10 Gbit per square inch (as stated at the 7$^{th}$ MMM-Intermag Joint Conference (January 1998, Session ZA). This recording density corresponds to a linear recording density of about 400 kFCI (Flux Change per Inch, or magnetization reversal number per inch), with the bit length being about 60 nm, assuming that the ratio of bit length to track width is about 20:1, which is common.

SUMMARY OF THE INVENTION

The thin-film medium for longitudinal magnetic recording now in use has a crystal grain diameter of about 15 nm. This implies that only four crystal grains arranged in the bit direction currently constitute a bit which is 60 nm long. This results in a large zigzag magnetic domain wall in the transition region. In other words, the magnetic domain wall fluctuates so greatly as to give rise to a problem in noise.

If the related art medium described in the first literature given above is designed such that the crystal grain size is 10 nm and the film thickness is 10 nm according to the related art technique so as to raise recording density and reduce noise, then the magnetic anisotropy energy of the crystal grains will be $K_u V = 1.2 \times 10^{-12}$ erg. This value is about one-forth of that possessed by the related art magnetic crystal grain before design. However, the relation of $K_u V > 25 k_B T$ is satisfied.

Unfortunately, simply reducing the crystal grain size and film thickness as mentioned above results in a medium which has a low coercive force at the higher operating temperature range (as mentioned later), and this medium does not produce sufficient high reproducing output. In other words, as the temperature of crystal grains rises by 50 K, reaching 350 K, the energy of thermal vibration increases to $k_BT=4.8\times10^{-14}$ erg. On the other hand, the magnetic anisotropy energy usually decreases with increasing temperature, and it disappears at the Curie point. In the case of $Co_{81}Cr_{15}Ta_4$ alloy described in the first US literature mentioned above, $K_u 1.3\times10^6$ erg/cc at T=300 K, while $K_u=1.0\times10^6$ erg/cc at T=350 K. In other words, a temperature rise of 50 K causes $K_u$ to decrease by 20% or more.

Consequently, the magnetic anisotropy energy of a single crystal grain at T=350 K is $K_uV=7.9\times10^{-13}$ erg, and the relationship between the energy of thermal vibration and the magnetic anisotropy energy becomes $K_uV<25$ $k_BT$. The result is that the magnetic moment in a crystal grain is hardly fixed in the direction of axis of easy magnetization, and this in turn leads to a decreased coercive force and an unstable state of recording magnetization.

The present invention contributes to eliminate the above-mentioned disadvantages involved in the related art technology. It is an object of the present invention to provide a magnetic recording medium which has a high level of magnetic anisotropy energy, retains stably the state of recording magnetization within the operating temperature range, and is suitable for high-density recording with a low noise level. It is another object of the present invention to provide a magnetic storage device with said magnetic recording medium.

The above-mentioned object of the present invention is achieved by a magnetic recording medium which is characterized in that the magnetic anisotropy energy at 300 K is $K_u \geq 3.6\times10^6$ erg/cc and the average particle diameter (d) of magnetic crystal grains is 5 nm<d<12 nm. ("d" is defined as the diameter of a circle having the same area as that of a magnetic crystal grain in the direction of the plane of the film.) The magnetic recording medium like this can be realized by the steps of forming an underlying film for orientation control, forming thereon an underlying film for lattice alignment, forming thereon a film of Co—Cr alloy magnetic body containing an added element, and performing heat treatment, thereby diffusing the added element into the crystal grain boundary. (This process will be explained later in more detail.)

The diameter of magnetic crystal grain was established as mentioned above for the following-reason. As the grain size increases, the fluctuation of the zigzag magnetic domain wall in the transition region increases due to the crystal size distribution and the crystal grain arrangement distribution, thus increasing medium noise resulting from transition noise. By contrast, as the grain size decreases, the volume of crystal grain decreases and hence the magnetic anisotropy energy decreases. The optimum range was established in consideration of these two points.

In the case where the linear recording density is 400 kFCI (as mentioned above) and the bit length is about 60 nm, the number of crystal grains constituting the bit in the lengthwise direction should be at least 5. Four crystal grains are insufficient to eliminate noise. (This has been found from the study of noise.) The foregoing leads one to conclude that the average particle diameter of magnetic crystal grains constituting the magnetic recording film should be smaller than 12 nm. On the other hand, if the particle diameter of magnetic crystal grains is 5 nm or smaller, the volume of each crystal grain is excessively small. The result is that the energy of thermal vibration of magnetic moment is larger than the magnetic anisotropy energy of magnetic crystal grains to keep their magnetic moment in the direction of axis of easy magnetization. Thus, the magnetic moment cannot stably orient in the direction of axis of easy magnetization, and the magnetic crystal grains exhibit the properties of super paramagnetism. For this reason, the average particle diameter (d) of magnetic crystal grains should be within the range of 5 nm<d<12 nm.

The above-mentioned magnetic anisotropy energy $K_u$ was derived from the following view point. For the state of recording magnetization to remain stable regardless of temperature change, it is necessary that the ratio of $K_uV/k_BT$ (where $K_uV$ is the magnetic anisotropy energy of magnetic crystal grains and $k_BT$ is the energy of thermal vibration of magnetic crystal grains) should have a sufficiently large value within the operating temperature range of the magnetic storage device or the magnetic recording/reproducing apparatus.

The relation between the magnetic moment energy $K_uV$ and the energy of thermal vibration $k_BT$ was studied from the view point of the stability of reproducing output with time. (IEEE Transaction of Magnetics, vol. 33, No. 5 (September 1997), pp. 3028–3030, as the third US literature.) The authors of the literature measured the output of reproducing signals from the head immediately after bit recording and after standing for 96 hours. They found that the output decreased by only 4% after standing 96 hours if the $k_uV/k_BT$ is about 85, whereas the output decreased by 10% or more after standing 96 hours if the $K_uV/k_BT$ is about 55.

A decrease in output by 4% after standing 96 hours is desirable for the recording/reproducing. characteristics of the magnetic storage device. Therefore, for the recording magnetization to remain stable in the operating temperature range of the magnetic storage device, it is necessary that the condition of $K_uV/k_BT>85$ should be satisfied in the neighborhood of T=350 K which is the upper limit of the operating temperature. Also, in order to realize the high-density recording, it is necessary that the average particle diameter of crystal grains should be in the range of 5 nm<d<12 nm. It follows from this crystal grain size that the magnetic anisotropy energy of magnetic crystal grains which meets the condition of $K_uV/k_BT>85$ at T=350 K should be $K_u$ (T=350 K)$\geq 3.0\times10^6$ erg/cc.

The magnetic anisotropy energy is the main cause of the coercive force of the recording medium. Therefore, when the magnetic anisotropy greatly varies within the operating temperature range of the magnetic storage device, the temperature dependence of coercive force also increases accordingly. Consequently, it is desirable to keep at about 10% the change of coercive force within the temperature range from T=300 K to T=350 K. It follows from this that the change with temperature in magnetic anisotropic energy should be such that $K_u$(T=350 K)/$K_u$(T=300 K)$\geq 0.85$. This leads one to the conclusion that the magnetic anisotropic energy at T=300 K should be such that $K_u$(300 K)$\geq 3.6\times10^6$ erg/cc and $[K_uV/k_BT]$ (T=350 K)/$[K_uV/k_BT]$ (T=300 K)$\geq 0.73$.

As mentioned above, the magnetic recording medium for high-density recording should be able to keep the state of microcrystalline grains and to stably retain the state of recording magnetization. To this end, it is necessary to make the magnetic recording film (layer) from a magnetic material which has a greater magnetic anisotropy energy than the related art one, and it is also necessary to minimize the change with temperature in magnetic anisotropy energy within the operating temperature range of the magnetic storage device.

Incidentally, in order to reduce noise resulting from the zigzag magnetic domain wall in the magnetization transition region of the medium, it is desirable to reduce the length and width of the magnetizing transition region between one recording bit and its adjacent bit.

The length and width of the magnetizing transition region of a medium is usually proportional to the product of "t" (the thickness of the magnetic recording film constituting the medium) and "Br" (the residual magnetic flux density of the magnetic recording film of the medium). Therefore, the smaller the value of Br·t, the lower the noise level and the better the S/N of the medium for high-density recording. On the other hand, a decreased value of Br·t leads to a decrease in magnetic flux leaking from the recording bit, which reduces the output of the reproducing head.

For this reason, the value of Br·t should be in the range of 30 Gauss·$\mu$m<Br·t<80 Gauss·$\mu$m, so as to keep the medium S/N high and to prevent the decrease of output in the case of high-density recording.

A mention is made below of the material from which the recording medium is made. The magnetic anisotropy energy of a magnetic alloy is greatly affected by the combination and composition of elements constituting the magnetic material. In the case of an ordered alloy, it is greatly affected by whether the ordered alloy is in the ordered state or non-ordered state. In general, if Co is incorporated with a noble metal (such as Pt) or a rare earth metal element (such as Sm), the resulting alloy increases in magnetic anisotropy. If Co is incorporated with a non-magnetic element (such as Cr), the resulting alloy decreases in saturation magnetization and also magnetic anisotropy accordingly. As the amount of non-magnetic element added increases, the curie point decreases, with the result that the magnetic anisotropy energy changes more with temperature in the neighborhood of room temperature.

The magnetic recording medium is a polycrystalline thin film composed of magnetic crystal grains. The magnetic properties of each crystal grain are responsible for the macroscopic magnetic characteristics of the thin film as a whole. In other words, if individual magnetic crystal grains have a large magnetic anisotropy energy, have a Curie point which is sufficiently higher compared with the operating temperature range of the magnetic storage device, and changes less with temperature in magnetic anisotropy energy in the operating temperature range, then the medium film would have macroscopic magnetic characteristics similar to them.

Thus, it is a good practice to increase the ratio of ferromagnetic element, noble metal, and rare earth element in individual magnetic crystal grains and to decrease the ratio of non-magnetic added element in them. However, simply increasing the ratio of magnetic elements in the magnetic crystal grains causes exchange interaction to act on between crystal grains. This increases noise resulting from the zigzag magnetic domain wall in the transition region between recording bits. This is not desirable from the view point-of the recording/reproducing characteristics of the medium. Thus, it is necessary to non-magnetize the grain boundary so as to eliminate exchange interaction between crystal grains.

As mentioned above, there is a contradiction between the magnetic characteristics required of crystal grains proper and the magnetic characteristics required of the grain boundary.

In order to realize a medium which satisfies both characteristics, the film is formed from a Co—Cr alloy magnetic material by a process which employs a higher sputtering energy than the related art sputtering process and the resulting film undergoes heat treatment (as mentioned later in detail). This process permits the added elements to diffuse (for segregation) from the inside of magnetic crystal grains to the crystal grain boundary. In this way it is possible to realize the magnetic recording medium which meets the above-mentioned requirements.

DETAILED DESCRIPTION OF THE INVENTION

Figure 1:
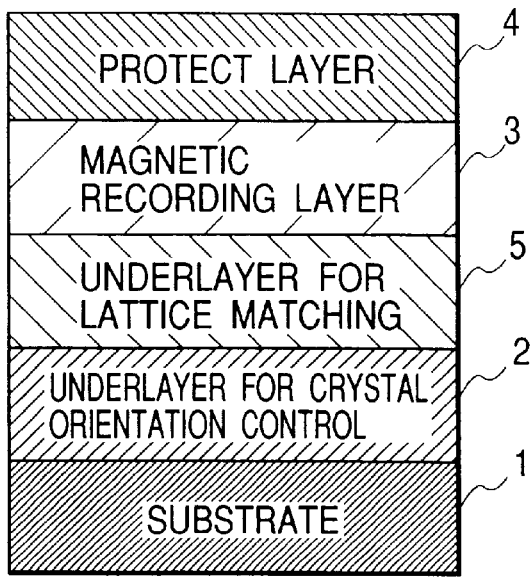
FIG. 1 is a schematic diagram showing the structure of the magnetic recording medium pertaining to the present invention for comparison.

The present invention will be described in more detail with reference to the following examples and drawings. The identical reference numerals in FIGS. 1 and 2 denote those parts which have the same characteristics and performance.

FIG. 1 shows the structure of a magnetic recording medium for longitudinal recording. The magnetic recording medium is composed of following layers.

1: a quartz substrate of the medium (for 3.5-inch disk).
2: an underlying film formed on said quartz substrate 1, which is intended to control the orientation of the magnetic film.
5: an underlying film formed on said underlying film 2, which is intended for lattice matching.
3: a magnetic recording film (which is a thin film of cobalt alloy) formed on said underlying film 5.
4: a protective film of carbon formed on said magnetic recording film 3. The underlying film 5 for lattice matching is special to this example. It is provided for lattice matching with the magnetic film 3.

A cleaned quartz substrate 1 was placed in a sputtering apparatus. With the apparatus evacuated to a degree of vacuum $1 \times 10^{-8}$ Torr or lower, the substrate 1 was heated to 300° C. and then allowed to stand at a constant temperature for 1 hour. On this substrate 1 were formed sequentially a Cr film (10 nm thick) as the underlying film 2 for orientation control and a Cr-(15 at. %)Ti film (20 nm thick) as the underlying film 5 for lattice matching. The underlying films 2 and 5 (or double-layer structure) were formed at a rate of 2 nm/sec by the DC magnetron sputtering, with the Ar gas pressure maintained at 3 mTorr.

On the multilayer underlying films 2 and 5 was formed the magnetic recording film (12 nm thick) having the average composition of Co-(15 at. %)Cr-(12 at. %)Pt-(3 at. %)Ta by ECR (Electron Cyclotron Resonance) sputtering which generates more energy than DC magnetron sputtering. The targets (excluding the C target) have a purity of 99.9%. The alloy thin film was formed from an alloy target having a composition corresponding to that of the film. The composition of each film mentioned above is an average composition of single film determined by ICPS (Inductively Coupled Plasma Spectroscopy).

The thin film sample prepared as mentioned above was subsequently transferred again to the heating stage of the sputtering apparatus. It underwent heat treatment in a vacuum in the following way. With the chamber evacuated to $5 \times 10^{-9}$ Torr, the sample was heated at a constant temperature of 450° C. for 15 minutes, followed by cooling to room temperature. Finally, on the outermost surface was formed a protective film of carbon (15 nm thick) at room temperature.

The recording medium prepared as mentioned above is designated as sample A. For the purpose of comparison, a recording medium of the related art structure was prepared, which is designated as sample B.

Figure 2:
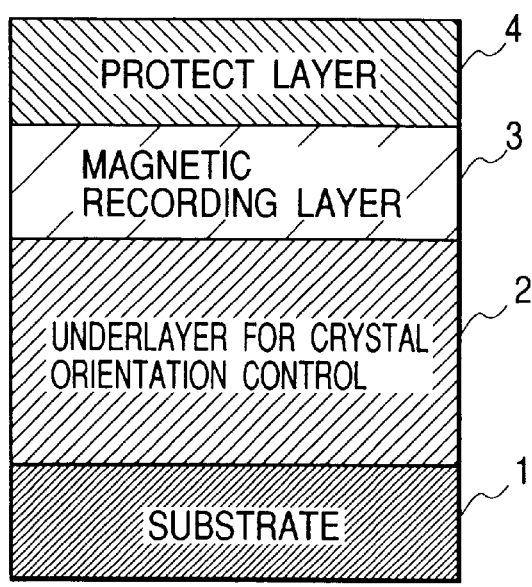
FIG. 2 is a schematic diagram showing the structure of the magnetic recording medium of the related art technology.

FIG. 2 shows the structure of sample B. In sample B, the magnetic film 3 is composed of Co-(16 at. %)Cr-(4 at. %)Ta. This magnetic film has a thickness of 12 nm, which is the same as that of sample A, for easy comparison of their characteristics. Sample B was prepared in the following way.

A cleaned substrate 1 of NiP plated aluminum alloy for magnetic disk was placed in a sputtering apparatus. With the apparatus evacuated to a vacuum lower than $1 \times 10^{-8}$ Torr, the substrate 1 was heated to 270° C. and then allowed to stand at a constant temperature for 1 hour. On this substrate 1 were formed sequentially a Cr film (50 nm thick) as the underlying film 2 for orientation control, a Co—Cr—Ta magnetic film (12 nm thick) as the magnetic recording film 3, and a protective film 4 of carbon. Sputtering was carried out at a rate of 2 nm/sec by the DC magnetron sputtering, with the Ar gas pressure maintained at 3 mTorr. The targets (excluding the C target) have a purity of 99.9%. The magnetic film was formed from an alloy target.

Thus prepared samples A and B were tested for recording/reproducing characteristics. Small pieces were cut out of them and they were examined for film structure and magnetic properties. The film structure was investigated by θ-2θ x-ray diffractometry. In sample A, the Cr—Ti underlying film gave reflection due to the (200) plane and (110) plane, with the latter having an intensity which is about one-tenth of that of the former. Also, in sample A, the magnetic film gave main reflection due to the (110) plane and reflection due to the (101) plane (whose intensity is about ⅕ of that of main reflection).

In sample B of the related art structure, the Cr underlying film gave reflection due to the (200) plane and the Co—Cr—Ta magnetic film gave reflection due to the (11.0) plane of hexagonal close-packed structure.

The results of sample A suggest that the crystal grains of the Cr—Ti underlying film are mostly oriented in the (100) direction and hence the magnetic film, which has epitaxially grown on this underlying film, is oriented in the (110) direction, and that the crystal grains of the Cr—Ti underlying film are partly oriented in the (110) direction and hence the magnetic film has grown, with orientation in the (101) direction, according to the part oriented so. The diffraction plane of the magnetic film is indicated by four indices, with the third term omitted. Incidentally, the Cr underlying film gave no distinct peak of x-ray diffraction.

Both samples were examined for the microstructure of crystals by observing the plain TEM image of the magnetic film with an electron microscope. In sample A, the average crystal particle diameter was about 10.5 nm. In sample B of the related art structure, the average crystal particle diameter was about 13 nm, with a broader particle diameter distribution. The particle diameter distribution of sample A is about 20% smaller than that of sample B. The investigation of the sectional structure of crystal grains revealed that the crystal lattice continues from the Cr—Ti film for orientation control to the magnetic film. This suggests that good crystals were obtained by epitaxial growth with lattice matching.

Both samples were also examined for the composition distribution of individual crystal grains. The composition at an arbitrary point on the magnetic film was analyzed by using an analytical electron microscope equipped with an EDX analyzer (Energy Dispersive method in X-ray Spectroscopy) having a space resolving power of 2 nm. It was found that, in sample A, the content of Cr at the crystal grain boundary is as high as 25 at. %, whereas the content of Cr in the crystal grain is about 8 at. % on average. In other words, it was found that the Cr content in crystal grains is only one half of that of the average film composition. It was proved that heat treatment after film forming causes the added element to diffuse (for segregation) from the inside of magnetic crystal grains to the crystal grain boundary. Thus, it was possible to obtain the structure which contributes to reduction of noise due to medium, as mentioned above.

Then, the magnetic anisotropy energy of the magnetic film was examined. The measuring method is explained below. Since the medium is a polycrystalline thin film in which crystals are oriented and dispersed, it is usually difficult to obtain the magnetic anisotropy energy of the medium material. One way to get around this difficulty is to determine the magnetic anisotropy constant by measuring the magnetic torque of a single-crystal thin-film sample prepared from the magnetic material used for the medium. On the other hand, there is a prevailing means to obtain the magnetic anisotropy of the medium sample as such. That is, the anisotropic magnetic field of the medium is indirectly estimated by measuring the dependence of the rotational hysteresis loss of the medium on the applied magnetic field. Unfortunately, the anisotropic magnetic field obtained in this way is vulnerable to the magnetic mutual action between magnetic crystal grains and the orientation and dispersion of crystals.

In order to remedy this drawback, there has been proposed a method of extrapolating the magnetic anisotropy energy of a medium from the magnitude of magnetic torque which is measured when a magnetic field is applied in the direction of 45 degrees with respect to the film surface of the medium. (See IEEE Transaction on Magnetics, vol. 32, No. 5 (September 1997), pp. 4902–4904, as the fourth US literature.) This method permits higher precision of measurements than the related art methods because it treats statistically the effect of crystal orientation and dispersion. The method of measuring the magnetic torque at 45 degrees is best at present for measurements of the magnetic anisotropy of an actual medium. Hence, it was adopted for measurements of samples in this example.

Figure 3:
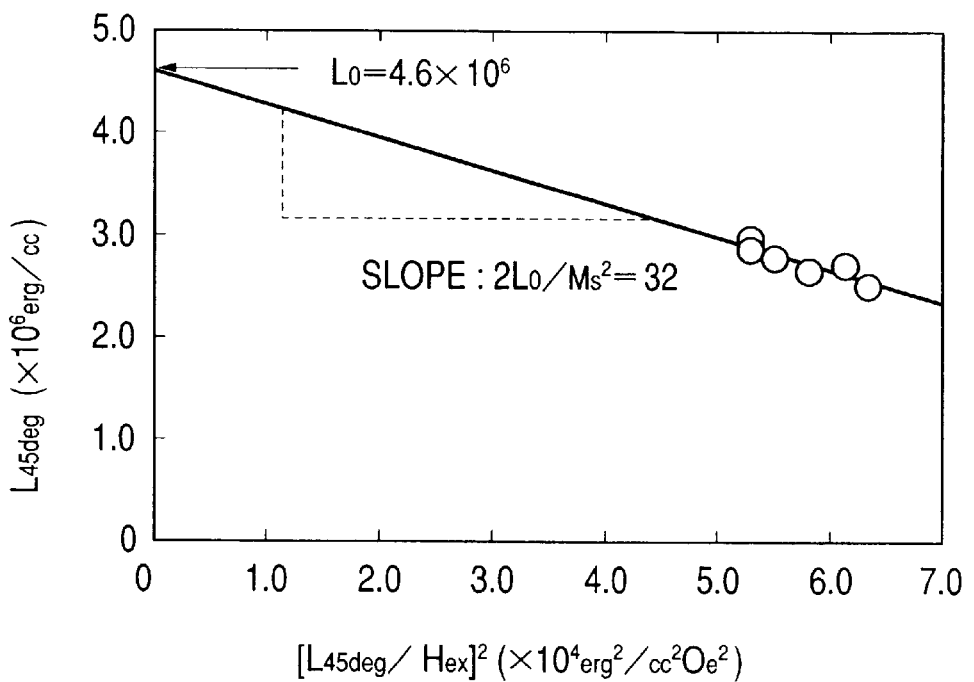
FIG. 3 is a graphical representation illustrating the magnetic torque which occurs when the magnetic field is applied in the direction of 45 degrees.

Samples A and B were tested for the temperature dependence of magnetic anisotropy in the range of 300 K to 375 K in the following manner by using a magnetic torque meter. A magnetic torque meter was attached to sample A such that a magnetic field was applied in the direction of 45 degrees with respect to the film surface of the sample. With the sample heated at T=300 K, a magnetic field $H_{ex}$ was applied within a range of 9 kOe to 13 kOe, at a step of 0.5 kOe to measure the magnetic torque $L_{45deg}(H_{ex})$ detected. FIG. 3 shows the relation between $[L_{45deg}(H_{ex})/H_{ex}]^2$ and $L_{45deg}(H_{ex})$. It is noted that the relation is approximately linear. This linear relation gives an equation (1) below, in which $L_o$ stands for a constant for the intersection on the $L_{45deg}$ axis and $M_s$ stands for the average saturation magnetization of the film.

$$L_{45deg}(H_{ex}) = L_o - [2L_o/M_s]^2 [L_{45deg}(H_{ex})/H_{ex}]^2 \quad (1)$$

The constant $L_o$ and the slope $[2L_o/M_s]^2$ were calculated by the least-squares method and the values of $L_o$ and $M_s$ were obtained from them.

Figure 4:
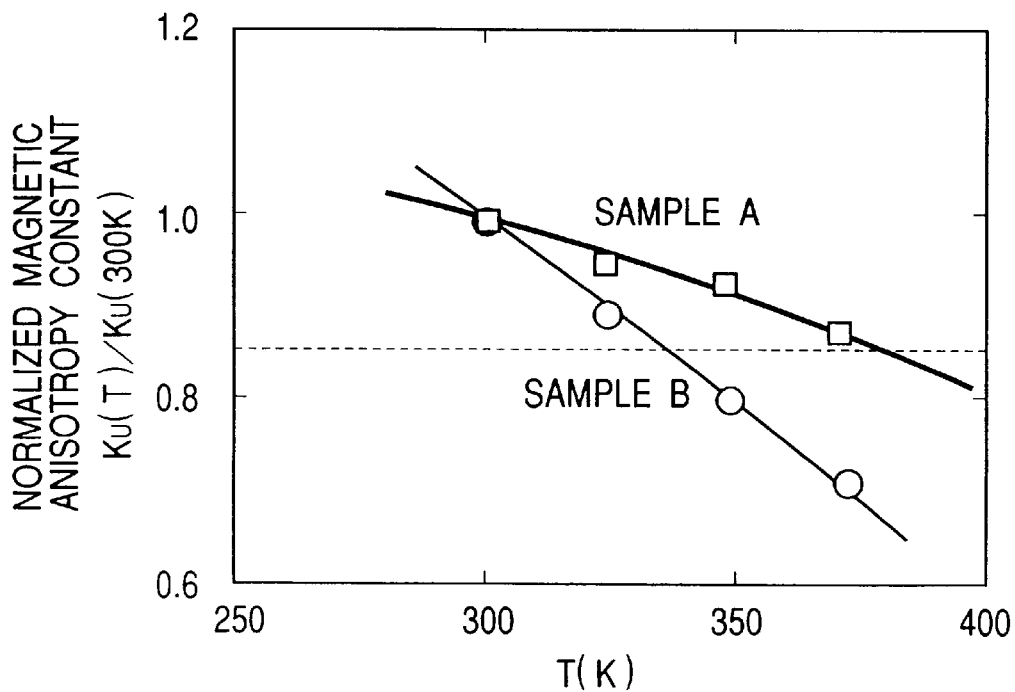
FIG. 4 is a graphical representation illustrating the change with temperature of the magnetic anisotropy constant measured.

In the case of sample A, $L_o=4.6\times10^6$ erg/cc and $M_s=540$ emu/cc at T=300 K, and hence the inequality $L_o \geq 2\pi M_s^2$ holds. Therefore, $K_u=2[L_o-2\pi M_s^2]=5.6\times10^6$ erg/cc, which satisfies $K_u(T=300 \text{ K})>3\times10^6$ erg/cc. The constants of magnetic anisotropy at different temperatures (T=325 K, 350 K, and 375 K) were obtained in the same way as mentioned above. FIG. 4 shows the temperature dependence of $K_u$ thus obtained. In the case of sample A, the value of $K_u$ decreased by only about 10% when the temperature rose from 300 K to 350 K. By contrast, in the case of sample B, the value of $K_u$ at 300 K was $1.2\times10^6$ erg/cc and the value of $K_u$ greatly decreased by about 20% when the temperature rose from 300 K to 350 K.

Figure 5:
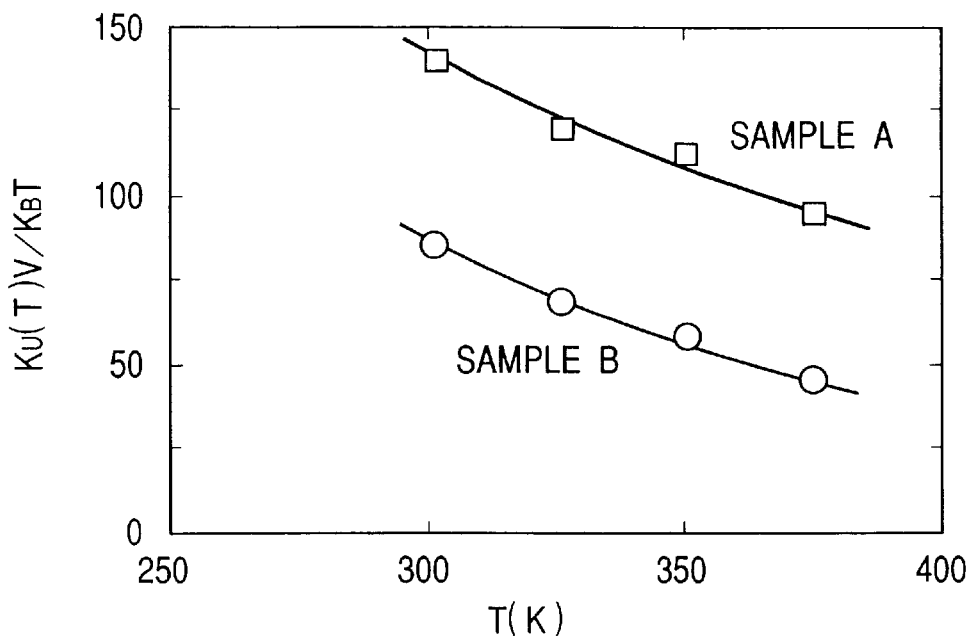
FIG. 5 is a graphical representation illustrating the temperature dependence on the ratio of magnetic anisotropy energy to thermal vibration energy.

For investigations on the stability of the state of magnetization, the change of $K_uV/k_BT$ with temperature was observed. The results are shown in FIG. 5. In the case of sample A, $K_uV/k_BT=140$ at T=300 K and $K_uV/k_BT=112$ at T=350 K. In other words, the value of $K_uV/k_BT$ decreased by about 20% when the temperature rose by 50 K. This amount of change with temperature coincides with the sum of the amount of decrease proportional to 1/T and the amount of decrease of $K_u$ itself occurred due to temperature rise. In case of sample B, $K_uV/k_BT=85$ at T=300 K and $K_uV/k_BT=58$ at T=350 K. In other words, the value of $K_uV/K_BT$ greatly decreased by 30% or more when the temperature rose by 50 K.

Figure 6:
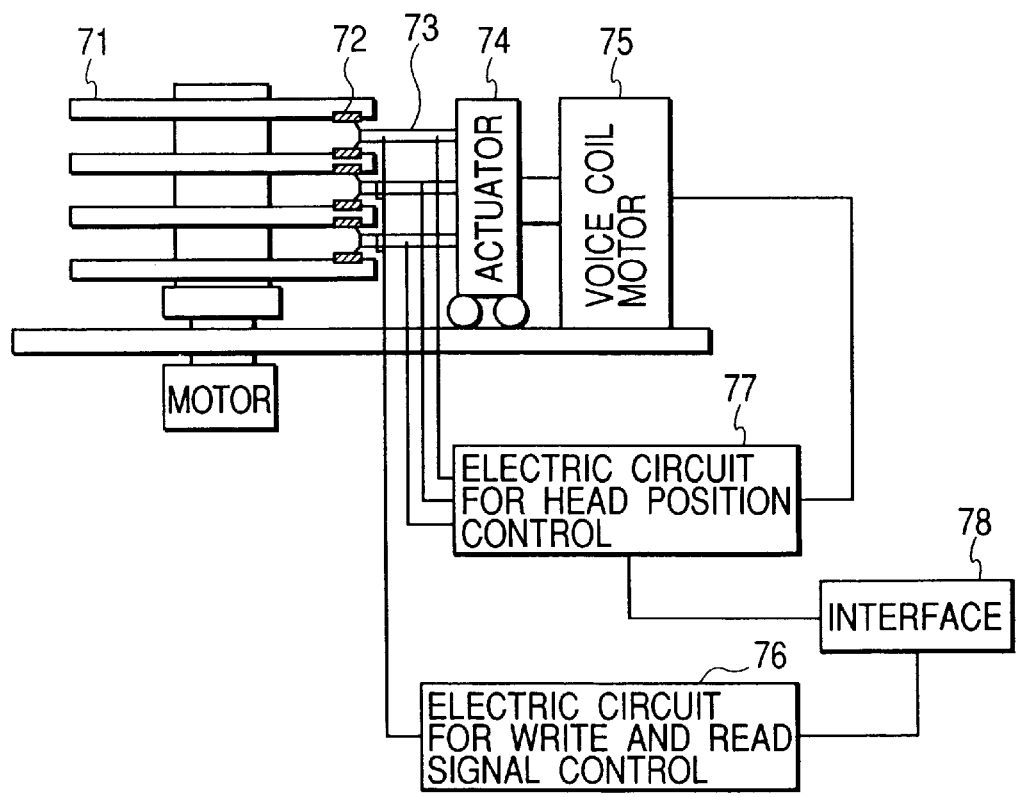
FIG. 6 is a schematic diagram showing the magnetic storage device with the magnetic recording medium of the present invention.

FIG. 6 shows an embodiment of the magnetic storage device (magnetic recording/reproducing device) which runs the above-mentioned magnetic recording medium. The magnetic storage device is constructed of the following components.

71: a magnetic recording medium mentioned above.
72: a magnetic head (opposing to the magnetic recording medium) which picks up magnetic information as electrical signals.
73: a suspension to hold the heads 72.
74: an actuator.
75: a voice coil motor to drive the actuator 74.
77: a head positioning circuit.

Electrical signals from the magnetic head 72 are introduced to a recording/reproducing circuit 76. Electrical signals to and from this magnetic storage device pass through an interface circuit 78. The medium 71 is driven by a motor 79.

For investigations on the stability of the state of magnetization in actual recording, the magnetic storage device shown in FIG. 6 was run to perform recording in a linear density of 200 kFCI. The reproducing output was measured immediately after recording and about 100 hours after recording. Recording was carried out by using a thin-film head with a track width of 2.5 µm and a gap length of 0.3 µm. Reproducing was carried out by using a magneto-resistive head with a track width of 2 µm and a shield distance of 0.2 µm. During recording and reproducing, the head was held 0.06 µm above the surface of the protective film of the medium. The speed of the slider relative to the substrate was kept at 11 m/s.

Recording with a linear density of 200 kFCI was carried out at a normal temperature of T=300 K. Immediately after recording, reproducing was carried out. The recording medium was allowed to stand at 300 K for 100 hours. Then, reproducing was carried out again. In the case of sample A, the reproducing output after standing for 100 hours was about 99% of the reproducing signal output measured immediately after recording. In consideration of experimental errors, it can be said that there was very little decrease in reproducing output even after standing for 100 hours.

Recording with a linear density of 200 kFCI was carried out at a raised temperature of T=350 K. Reproducing was carried out immediately after recording and 100 hours after recording. The reproducing output after standing for 100 hours decreased by only 2% from that measured immediately after recording. In other words, the state of recording magnetization remained sufficiently stable.

By contrast, in the case of sample B, the reproducing output 100 hours after the recording showed about 5% and about 12% decrease, lower than that immediately after recording at T=300 K and T=350 K, respectively. This result indicates that the magnetic A storage device with sample B does not keep recording bits stable over a long period of time.

It has been demonstrated in the foregoing that the present invention provides a magnetic recording medium which changes in magnetic anisotropy energy only a little with temperature within the operating temperature range of the apparatus, and which has a low noise level and is suitable for high-density recording, keeping the recording and reproducing characteristics stable over a long period of time. The present invention also provides a magnetic storage device with high reliability and large capacity which is based on said magnetic recording medium.

What is claimed is:

1. A magnetic recording medium including a magnetic recording film, wherein the magnetic recording film is characterized in that its magnetic anisotropy energy constant $K_u$ at an absolute temperature T of 300 K is $K_u$ (T=300 K)$\geq 3.6\times10^6$ erg/cc and the average particle diameter (d) of magnetic crystal grains is 5 nm<d<12 nm, where d is defined as the diameter of a circle having the same area as that of a magnetic crystal grain in the direction of the plane of the film, and the magnetic recording film satisfies the following relationship:

$$K_u(T=350 \text{ K})/K_u(T=300 \text{ K}) \geq 0.85$$

where $K_u$ (T=350 K) is the magnetic anisotropy energy constant at an absolute temperature T of 350 K and $K_u$ (T=300 K) is the magnetic anisotropy energy constant at an absolute temperature T of 300 K.

2. A magnetic recording medium including a magnetic recording film, wherein the magnetic recording film is characterized in that its magnetic anisotropy energy constant $K_u$ at an absolute temperature T of 300 K is $K_u$ (T=300 K)$\geq 3.6\times10^6$ erg/cc and the average particle diameter (d) of magnetic crystal grains is 5 nm<d<12 nm, where d is defined as the diameter of a circle having the same area as that of a magnetic crystal grain in the direction of the plane of the film, and the magnetic recording film satisfies the following relationship:

$$[K_uV/K_Bt](T=350 \text{ K})/[K_uV/K_Bt](T=300 \text{ K}) \geq 0.73$$

where V is the average volume of magnetic crystal grains, $K_u$ is the magnetic antisotropy constant of magnetic crystal grains, $K_B$ is the Boltzmann constant, and T is the absolute temperature, with the product of $K_B$ and T representing the energy of thermal vibration.

3. A magnetic recording medium according to claim 1, wherein the magnetic film satisfies the following relationship:

$$[K_u V/K_B t](T=350\ K) > 85$$

where V is the average volume of magnetic crystal grains, $K_u$ is the magnetic antisotropy constant of magnetic crystal grains, $K_B$ is the Boltzmann constant, and T is the absolute temperature, with the product of $K_B$ and T representing the energy of thermal vibration.

4. A magnetic recording medium according to claim 2, wherein the magnetic film satisfies the following relationship:

$$[K_u V/K_B t](T=350\ K) > 85$$

where V is the average volume of magnetic crystal grains, $K_u$ is the magnetic antisotropy constant of magnetic crystal grains, $K_B$ is the Boltzmann constant, and T is the absolute temperature, with the product of $K_B$ and T representing the energy of thermal vibration.

5. A magnetic storage device with a magnetic recording medium including a magnetic recording film, wherein the magnetic recording film is characterized in that its magnetic anisotropy energy constant $K_u$ at an absolute temperature T of 300 K is $K_u$ (T=300 K)$\geq 3.6\times 10^6$ erg/cc and the average particle diameter (d) of magnetic crystal grains is 5 nm<d<12 nm, where d is defined as the diameter of a circle having the same area as that of a magnetic crystal grain in the direction of the plane of the film, and the magnetic recording film satisfies the following relationship:

$$K_u(T=350\ K)/K_u(T=300\ K) \geq 0.85,$$

where $K_u$ (T=350 K) is the magnetic anisotropy energy constant at an absolute temperature T of 350 K and $K_u$ (T=300 K) is the magnetic anisotropy energy constant at an absolute temperature T of 300 K.

6. A magnetic storage device with a magnetic recording medium including a magnetic recording film, wherein the magnetic recording film is characterized in that its magnetic anisotropy energy constant $K_u$ at an absolute temperature T of 300 K is $K_u$ (T=300 K)$\geq 3.6\times 10^6$ erg/cc and the average particle diameter (d) of magnetic crystal grains is 5 nm<d<12 nm, where d is defined as the diameter of a circle having the same area as that of a magnetic crystal grain in the direction of the plane of the film, and the magnetic recording film satisfies the following relationship:

$$[K_u V/K_B t](T=350\ K)/[K_u V/K_B t](T=300\ K) \geq 0.73,$$

where V is the average volume of magnetic crystal grains, $K_u$ is the magnetic antisotropy constant of magnetic crystal grains, $K_B$ is the Boltzmann constant, and T is the absolute temperature, with the product of $K_B$ and T representing the energy of thermal vibration.

\* \* \* \* \*